(12) United States Patent
Frazier et al.

(10) Patent No.: US 6,941,350 B1
(45) Date of Patent: Sep. 6, 2005

(54) METHOD AND APPARATUS FOR RELIABLY CHOOSING A MASTER NETWORK MANAGER DURING INITIALIZATION OF A NETWORK COMPUTING SYSTEM

(75) Inventors: Giles Roger Frazier, Austin, TX (US); Gregory Francis Pfister, Austin, TX (US); Steven Mark Thurber, Austin, TX (US); Dono Van-Mierop, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 09/692,346

(22) Filed: Oct. 19, 2000

(51) Int. Cl.$^7$ .............................................. G06F 15/16
(52) U.S. Cl. ...................................... 709/209; 709/223
(58) Field of Search ............................. 709/208, 209, 709/223; 710/110; 714/4; 713/300

(56) References Cited

U.S. PATENT DOCUMENTS

| | | | |
|---|---|---|---|
| 4,638,356 A | 1/1987 | Frezza ........................ | 358/118 |
| 4,814,984 A * | 3/1989 | Thompson .................. | 709/209 |
| 4,939,752 A * | 7/1990 | Literati et al. .............. | 370/238 |
| 4,951,225 A | 8/1990 | Lee et al. .................... | 364/513 |
| 4,975,829 A | 12/1990 | Clarey et al. ................ | 364/200 |
| 5,043,981 A | 8/1991 | Firoozmand et al. ....... | 370/85.1 |
| 5,185,736 A | 2/1993 | Tyrrell et al. ................ | 370/55 |
| 5,185,741 A | 2/1993 | Iguchi et al. ............ | 370/110.1 |
| 5,218,680 A | 6/1993 | Farrell et al. ................ | 395/325 |
| 5,402,416 A | 3/1995 | Cieslak et al. ................ | 370/60 |
| 5,461,608 A * | 10/1995 | Yoshiyama .................. | 370/222 |
| 5,513,368 A | 4/1996 | Garcia, Jr. et al. .......... | 395/842 |
| 5,551,066 A | 8/1996 | Stillman et al. .............. | 455/69 |

(Continued)

FOREIGN PATENT DOCUMENTS

| | | | |
|---|---|---|---|
| JP | 2002064587 | 4/2002 | ........... G06F 15/16 |

(Continued)

OTHER PUBLICATIONS

Nehmer et al., "A Fault Tolerance Approach for Distributed ISDN Control Systems," 1990, Proceedings of the fourth workshop on ACM SIGOPS European workshop, 1990, pp. 1-4.*

Primary Examiner—Bradley Edelman
(74) Attorney, Agent, or Firm—Duke W. Yee; Mark E. McBurney; Stephen R. Tkacs

(57) ABSTRACT

A method in a node within network computing system for selecting a master network manager, wherein the first node is associated with a first priority. Requests are sent to the network computing system to discover other nodes within the network computing system. A second priority from the request is identified in response to receiving a response to one of the requests from another node within the network computing system. The first node shifts to a standby mode if it discovers a master subnet manager or the second priority is higher than the first priority. The first node shifts to a master mode if a response containing a priority higher than the first priority is absent in responses received by the first node and the first node has completed checking all other nodes in the network computing system. In the case where the priority received is equal, the comparison is further made on the globally unique identifier which is received from the same node, in which case the node with the lowest globally unique identifier wins the arbitration.

28 Claims, 5 Drawing Sheets

U.S. PATENT DOCUMENTS

| | | | | |
|---|---|---|---|---|
| 5,610,980 | A | | 3/1997 | Johnson et al. ................ 380/4 |
| 5,617,424 | A | | 4/1997 | Murayama et al. ......... 370/389 |
| 5,617,537 | A | | 4/1997 | Yamada et al. ........ 395/200.01 |
| 5,719,938 | A | | 2/1998 | Haas et al. ................... 380/21 |
| 5,729,686 | A | * | 3/1998 | Heck et al. ................. 709/208 |
| 5,758,083 | A | | 5/1998 | Singh et al. ........... 395/200.53 |
| 5,778,176 | A | | 7/1998 | Geihs et al. ........... 395/200.12 |
| 5,793,968 | A | * | 8/1998 | Gregerson et al. .......... 709/209 |
| 5,805,072 | A | | 9/1998 | Kakemizu .............. 340/825.03 |
| 5,884,036 | A | * | 3/1999 | Haley ......................... 709/224 |
| 5,907,689 | A | * | 5/1999 | Tavallaei et al. ............ 710/110 |
| 5,951,683 | A | * | 9/1999 | Yuuki et al. ................... 713/1 |
| 6,032,191 | A | | 2/2000 | Chowdhury et al. ........ 709/238 |
| 6,081,752 | A | | 6/2000 | Benson, IV et al. .......... 700/79 |
| 6,085,238 | A | | 7/2000 | Yuasa et al. ................ 709/223 |
| 6,092,214 | A | * | 7/2000 | Quoc et al. ..................... 714/4 |
| 6,098,098 | A | | 8/2000 | Sandahl et al. ............. 709/221 |
| 6,108,739 | A | | 8/2000 | James et al. ................ 710/113 |
| 6,115,776 | A | | 9/2000 | Reid et al. .................. 710/260 |
| 6,128,738 | A | | 10/2000 | Doyle et al. ................ 713/185 |
| 6,192,397 | B1 | * | 2/2001 | Thompson ................. 709/209 |
| 6,199,133 | B1 | * | 3/2001 | Schnell ....................... 710/110 |
| 6,222,822 | B1 | | 4/2001 | Gerardin et al. ............ 370/230 |
| 6,269,396 | B1 | | 7/2001 | Shah et al. ................. 709/223 |
| 6,298,376 | B1 | * | 10/2001 | Rosner et al. .............. 709/209 |
| 6,304,973 | B1 | | 10/2001 | Williams .................... 713/201 |
| 6,311,321 | B1 | * | 10/2001 | Agnihotri et al. .............. 717/1 |
| 6,330,555 | B1 | | 12/2001 | Weber ............................ 707/2 |
| 6,341,322 | B1 | | 1/2002 | Liu et al. .................... 710/129 |
| 6,343,320 | B1 | | 1/2002 | Fairchild et al. ............ 709/224 |
| 6,363,411 | B1 | | 3/2002 | Dugan et al. ................ 709/202 |
| 6,363,416 | B1 | * | 3/2002 | Naeimi et al. .............. 709/209 |
| 6,363,495 | B1 | | 3/2002 | MacKenzie et al. ............ 714/4 |
| 6,389,432 | B1 | | 5/2002 | Pothapragada et al. ..... 707/205 |
| 6,434,113 | B1 | | 8/2002 | Gubbi ........................ 370/216 |
| 6,470,397 | B1 | | 10/2002 | Shah et al. ................. 709/250 |
| 6,496,503 | B1 | | 12/2002 | Pelissier et al. ............. 370/389 |
| 6,507,592 | B1 | | 1/2003 | Hurvig et al. .............. 370/503 |
| 6,529,286 | B1 | | 3/2003 | King .......................... 358/1.14 |
| 6,597,956 | B1 | | 7/2003 | Aziz et al. ...................... 700/3 |
| 6,636,520 | B1 | | 10/2003 | Jason et al. ................. 370/401 |
| 6,654,363 | B1 | | 11/2003 | Li et al. ...................... 370/338 |
| 6,658,417 | B1 | | 12/2003 | Stakutis et al. ............... 707/10 |
| 6,664,978 | B1 | | 12/2003 | Kekic et al. ................ 345/733 |
| 6,665,714 | B1 | | 12/2003 | Blumenau et al. .......... 709/222 |
| 6,674,911 | B1 | | 1/2004 | Pearlman et al. ........... 382/240 |
| 6,694,361 | B1 | | 2/2004 | Shah et al. ................. 709/222 |
| 6,708,272 | B1 | | 3/2004 | McCown et al. ........... 713/151 |
| 2002/0021307 | A1 | | 2/2002 | Glenn et al. ................ 345/753 |
| 2002/0026517 | A1 | | 2/2002 | Watson, Jr. ................. 709/228 |
| 2002/0073257 | A1 | | 6/2002 | Beukema et al. ........... 710/105 |
| 2002/0133620 | A1 | | 9/2002 | Krause ....................... 709/238 |
| 2003/0018787 | A1 | | 1/2003 | Neal et al. .................. 709/227 |
| 2003/0046505 | A1 | | 3/2003 | Craddock et al. ........... 711/165 |
| 2004/0057424 | A1 | | 3/2004 | Kokkonen .................. 370/352 |

FOREIGN PATENT DOCUMENTS

| | | | | |
|---|---|---|---|---|
| WO | WO 00/72159 | 11/2000 | ........... G06F 13/00 |

* cited by examiner

METHOD AND APPARATUS FOR RELIABLY CHOOSING A MASTER NETWORK MANAGER DURING INITIALIZATION OF A NETWORK COMPUTING SYSTEM

CROSS REFERENCES TO RELATED APPLICATIONS

The present invention is related to applications entitled A system Area Network of End-to-End Context via Reliable Datagram Domains, Ser. No. 09/692,354; Method and Apparatus for Pausing a Send Queue without Causing Sympathy Errors, Ser. No. 09/692,340, now U.S. Pat. No. 6,766,467; Method and Apparatus to Perform Fabric Management, Ser. No. 09/692,344; End Node Partitioning Using LMC for a System Area Network, Ser. No. 09/692,351; Method and Apparatus for Dynamic Retention of System Area Network Management Information in Non-Volatile Store, Ser. No. 09/692,365; Method and Apparatus for Retaining Network Security Settings Across Power Cycles, Ser. No. 09/692,337; Method and Apparatus for Reporting Unauthorized Attempts to Access Nodes in a Network Computing System, Ser. No. 09/692,348; Method and Apparatus for Ensuring Scalable Mastership During Initialization of a System Area Network, Ser. No. 09/692,341; and Method and Apparatus for Using a Service ID for the Equivalent of Port ID in a Network Computing System, Ser. No. 09/692,352, now abandoned, all of which are filed even data hereof, assigned to same assignee, and incorporated herein by reference.

BACKGROUND OF THE INVENTION

1. Technical Field

The present invention relates generally to an improved network computing system, and in particular to a method and apparatus for managing a network computing system. Still more particularly, the present invention provides a method and apparatus for selecting a master network manager in a network computing system.

2. Description of Related Art

In a System Area Network (SAN), the hardware provides a message passing mechanism which can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers". The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

These consumers are located on nodes within the SAN. A SAN may contain hundreds or thousands of nodes depending on the particular configuration. In managing a SAN, one or more nodes may be selected to function as a master, which is responsible for configuring and managing the SAN. Redundancies and efficient selection of a master is desirable within a SAN. Therefore, it would be advantageous to have an improved method and apparatus for selecting a master.

SUMMARY OF THE INVENTION

The present invention provides a method in a node within network computing system for selecting a master network manager, wherein the first node is associated with a first priority. Requests are sent to the network computing system to discover other nodes within the network computing system. A second priority from the request is identified in response to receiving a response to one of the requests from another node within the network computing system. The first node shifts to a standby mode if it discovers a master subnet manager or the second priority is higher than the first priority. The first node shifts to a master mode if a response containing a priority higher than the first priority is absent in responses received by the first node and the first node has completed checking all other nodes in the network computing system. In the case where the priority received is equal, the comparison is further made on the globally unique identifier which is received from the same node, in which case the node with the lowest globally unique identifier wins the arbitration.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a network computing system having end nodes, switches, routers, and links interconnecting these components. Each end node uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

Figure 1:
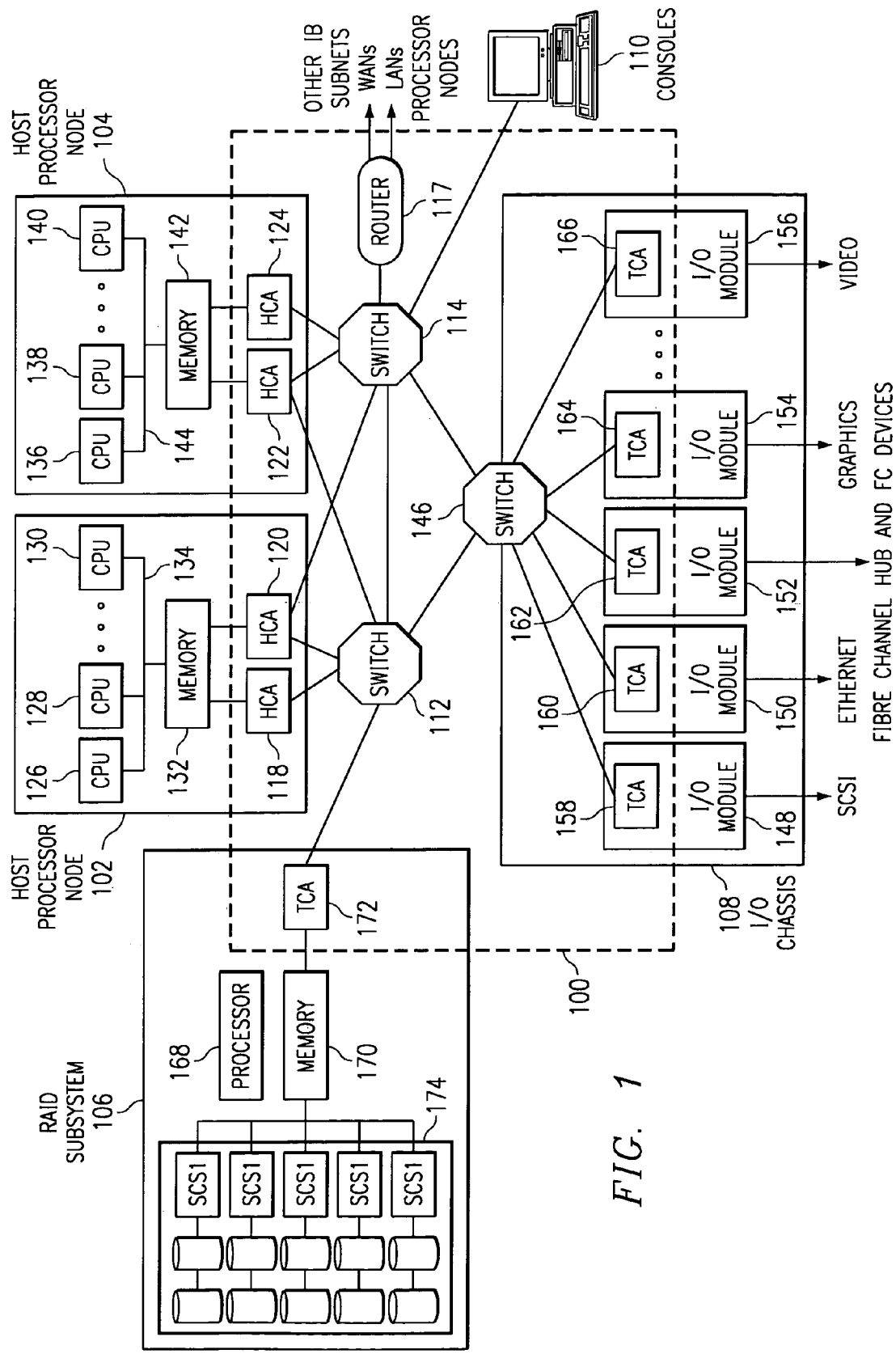
FIG. 1 is a diagram of a network computing system is illustrated in accordance with a preferred embodiment of the present invention.

With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the network computing system. A node is any component attached to one or more links of a network. In the depicted example, SAN 100 includes nodes in the form of host processor node 102, host processor node 104, redundant array independent disk (RAID) subsystem node 106, switch node 112, switch node 114, router node 117, and I/O chassis node 108. The nodes illustrated in FIG. 1 are for illustrative purposes only, as SAN 100 can connect any number and any type of independent processor nodes and I/O adapter nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in network computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a network computing system. The SAN 100 shown in FIG. 1 includes a switched communications fabric, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header destination local identifier (DLID) field. A router is a device that connects multiple subnets together and is capable of routing frames from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, RAID I/O subsystem 106 and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 includes a switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

Figure 2:
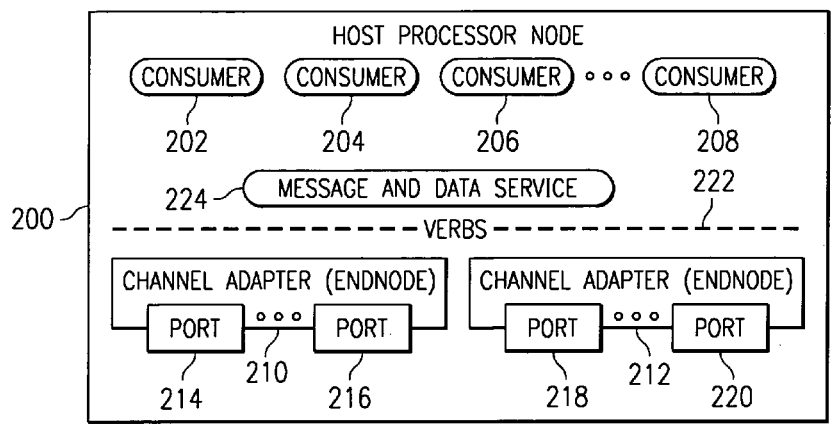
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Figure 3:
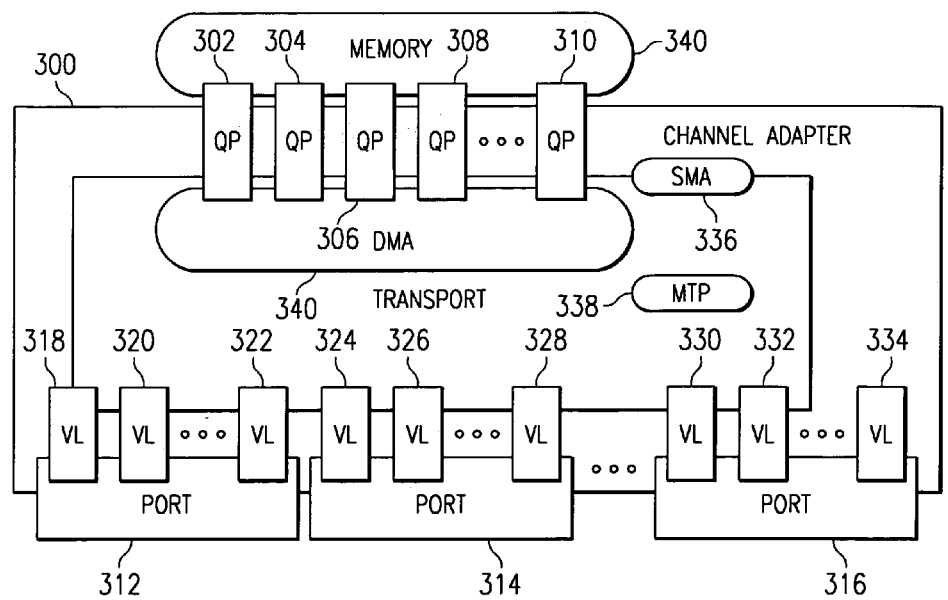
FIG. 3 is a diagram of a host channel adapter in accordance with a preferred embodiment of the present invention.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
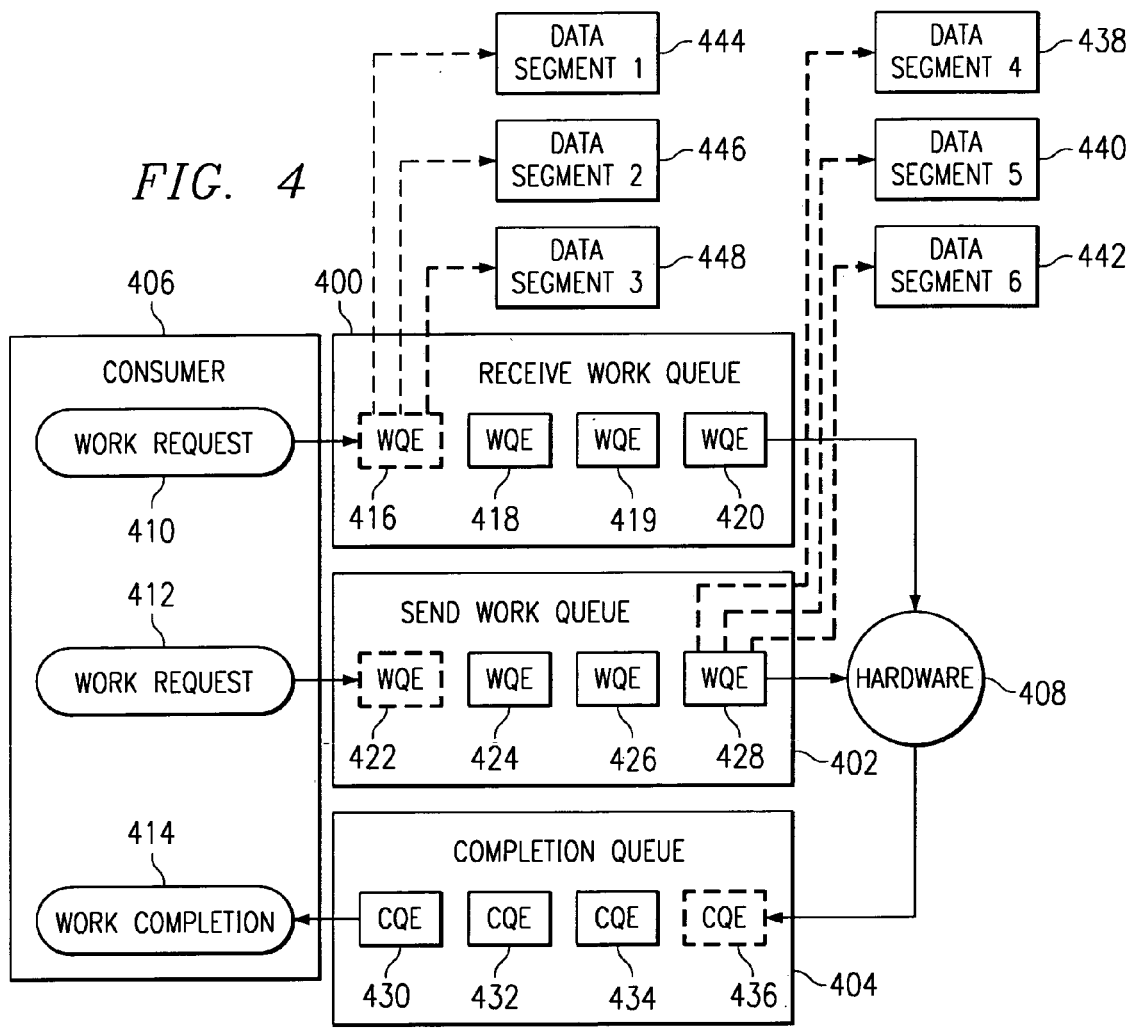
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a network computing system implementing the present invention supports four types of transport services.

Reliable and unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end-end (EE) context with one and only one remote end-end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an end node with a fixed number of queue pairs can communicate with far more processes and end nodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs +(N-1) EE contexts on each node for exactly the same communications.

The unreliable datagram service is connectionless. The unreliable datagram service is employed by management applications to discover and integrate new switches, routers, and end nodes into a given network computing system. The unreliable datagram service does not provide the reliability guarantees of the reliable connection service and the reliable datagram service. The unreliable datagram service accordingly operates with less state information maintained at each end node.

SAN architecture management facilities provide for a subnet manager (SM) and an infrastructure that supports a number of general management services. The management infrastructure requires a subnet management agent (SMA) in each node and defines a general service interface that allows additional general services agents.

The SAN architecture defines a common management datagram (MAD) message structure for communicating between managers and management agents. The subnet manager is an entity attached to a subnet that is responsible for configuring and managing switches, routers, and channel adapters. The subnet manager can be implemented with other devices, such as a channel adapter or a switch.

Figure 5:
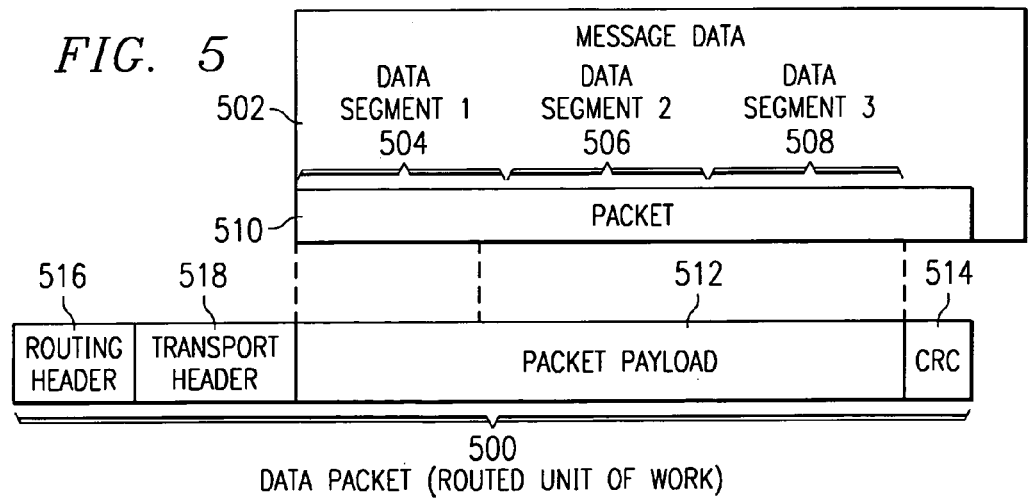
FIG. 5 is an illustration of a data packet in accordance with a preferred embodiment of the present invention.

Turning next to FIG. 5, an illustration of a data packet is depicted in accordance with a preferred embodiment of the present invention.

In data packet 500, message data 502 contains data segment 1 504, data segment 2 506, and data segment 3 508, which are similar to the data segments illustrated in FIG. 4. In this example, these data segments form a packet 510, which is placed into packet payload 512 within data packet 500. In these examples, the message segments used for subnet management contain an M_Key. The M_Key is used by the end node which is receiving the packet to determine if the subnet manager sending the packet has access to the subnet manager agent in the node. Additionally, data packet 500 contains CRC 514, which is used for error checking. Additionally, routing header 516 and transport 518 are present in data packet 500. Routing header 516 is used to identify source and destination ports for data packet 500. Transport header 518 in this example specifies the destination queue pair for data packet 500.

Additionally, transport header 518 also provides information such as the operation code, packet sequence number, and partition for data packet 500. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an end node may be configured to be members of one or more possibly overlapping sets called partitions.

SAN architecture management facilities provide for a subnet manager and an infrastructure that supports a number of general management services. The management infrastructure requires a subnet management agent in each node and defines a general service interface that allows additional general services agents. The SAN architecture includes a common management datagram (MAD) message structure for communicating between managers and management agents.

The subnet manager is an entity attached to a subnet that is responsible for configuring and managing switches, routers, and channel adapters. The subnet manager can be implemented with other devices, such as a channel adapter or a switch. The master subnet manager: (1) discovers the subnet topology; (2) configures each channel adapter port with a range of Local Identification (LID) numbers, Global Identification (GID) number, subnet prefix, and Partition Keys (P_Keys); (3) configures each switch with a LID, the subnet prefix, and with its forwarding database; and (4) maintains the end node and service databases for the subnet and thus provides a Global Unique Identification (GUID) number to LID/GID resolution service as well as a services directory.

Each node provides a subnet manager agent that the subnet manager accesses through a well known interface called the subnet management interface (SMI). Subnet manager interface allows for both LID routed packets and directed routed packets. Directed routing provides the means to communicate before switches and end nodes are configured.

SAN subnet management packets (SMPs) use an management key (M_Key) as an access control mechanism. When the subnet manager takes management control of a node, the subnet manager pushes its M_Key, along with a M_Key lease period, into each SAN component. The SAN component uses this M_Key to validate all future subnet management packets it receives within the M_Key lease period. Subsequent subnet management packets (SMPs) have their M_Key field compared with the value previously stored by subnet manager in the SAN component. If a M_Key field in a subnet management packet matches the M_Key value stored in the SAN component, the packet is accepted. Otherwise the packet is discarded.

The SAN architecture supports the notion of multiple subnet managers per subnet and specifies how multiple subnet managers negotiate for one to become the master subnet manager. Once a subnet manager gains control of a subnet, it can retain control as long as it does not lose its M_Key in the components of the subnet. Loss of the M_Key can happen under several circumstances. This loss can happen through a power cycle of the component which contains the M_Key, with the component coming up with the default M_Key when the power to the component is restored. This loss also may happen through a boot of the node which contains the subnet manager, such that the subnet manager goes away and the M_Key lease period expires in the component, in which case another subnet manager can take over control of the component.

The SAN architecture, in these examples, also supports the notion of a SM_Key. The SM_Key provides a additional level of authentication authority to control which subnet manager is allowed to be the master subnet manager. This also provides another level of granularity in determining which subnet managers are trusted is establishing standby subnet managers, that can backup the master subnet manager for redundancy and handoff.

When a SAN network is initializing, a priority scheme determines which of the potential subnet managers has the highest priority and therefore actually becomes the master subnet manager over the subnet. However, the lower-priority subnet managers must poll the master to ensure that they will be able to take over if it fails during initialization, or if parameters are changed after the initialization process. In large systems, hundreds or thousands of nodes may be present. These complex systems typically include redundancies, including backup subnet managers, which may take over when the primary subnet manager fails. During initialization, multiple subnet managers are available until one is chosen as the master subnet manager.

The present invention provides a method, apparatus, and computer implemented instructions for supporting the multiple subnet managers in a subnet and specify how multiple subnet managers negotiate for one to become the master subnet manager. During the SAN fabric configuration process at initial bring-up time, the subnet managers scan the network in order to discover the components that are connected to the network. If the subnet managers find a component that contains another subnet manager, then the subnet managers negotiate based on a previously setup priority. In the depicted examples, if the priorities are the same, then the winner of the arbitration process is the one with the lowest globally unique identification (GUID). The GUID is unique across the network, and therefore there can only be one winner of the arbitration among all the possible subnet managers in the network. Defining this master subnet manager negotiation precisely is important in order to assure interoperability of subnet managers from different manufacturers.

Figure 6:
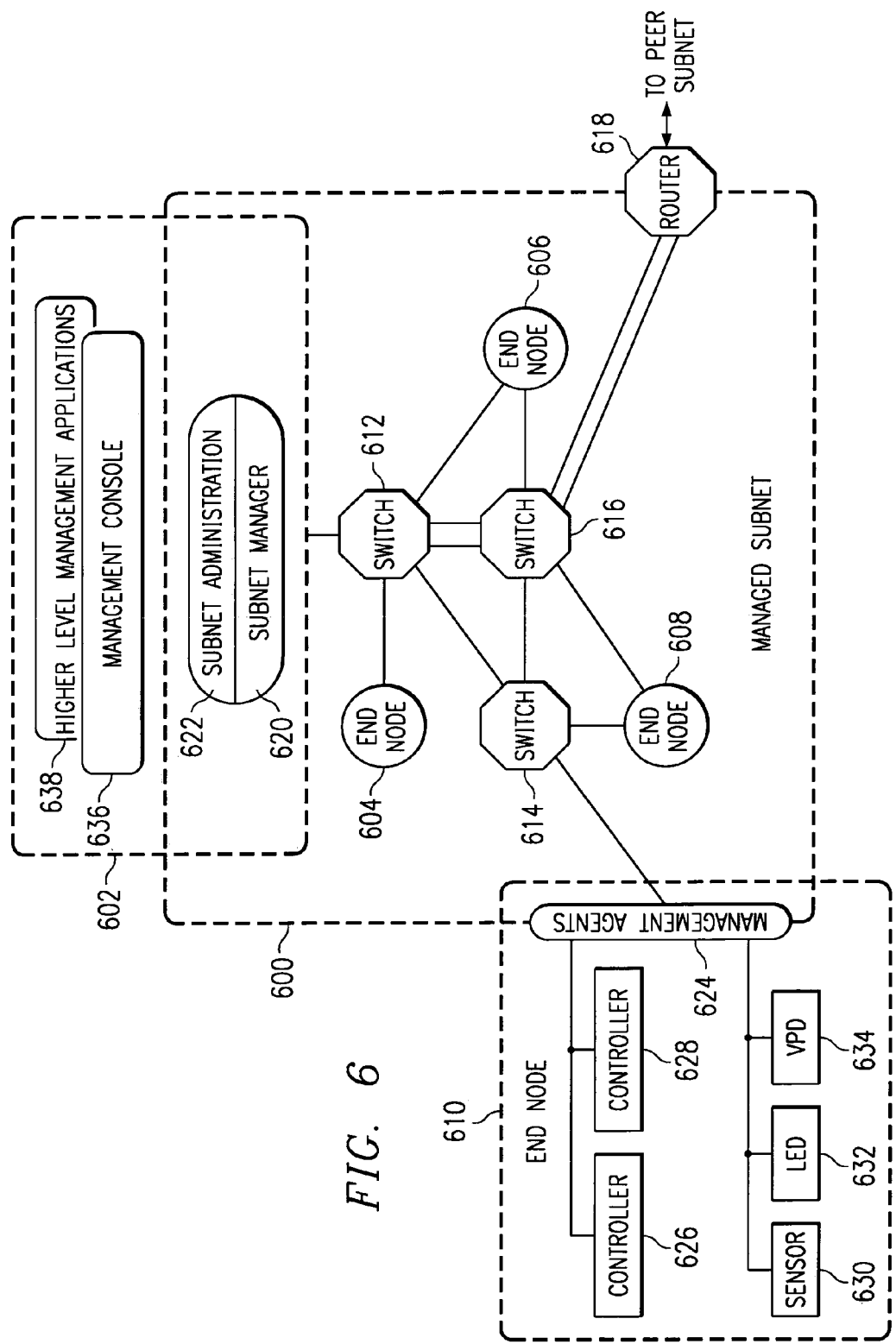
FIG. 6 is a diagram illustrating a system area network (SAN) management model in accordance with a preferred embodiment of the present invention.

Turning next to FIG. 6, a diagram illustrating a system area network (SAN) management model is depicted in accordance with a preferred embodiment of the present invention. In FIG. 6, the management of subnet 600 and SAN components like host processor node 602, end nodes 604–610, switches 612–616, and router 618 use two management services: subnet manager 620 and subnet administration 622. These two components are located in host node 602 in this example. A host node is a node that contains a host channel adapter and an end node is any node which is not a switch or a router. Subnet manager packets are used to discover, initialize, configure, and maintain SAN components through the management agent 624 in end node 610. In this example, end node 610 includes a controller 626, controller 628, sensor 630, light emitting diode (LED) 632, and Vital Product Data (VPD) 634.

SAN subnet management packets are used by the subnet manager to query and update subnet management data. Control of some aspects of the subnet management are through a user management console 636 in a host processor node 602. Additionally, higher level management applications 638 may be used in place of or in conjunction with management console 636 to manage and configure subnet 600.

Figure 7:
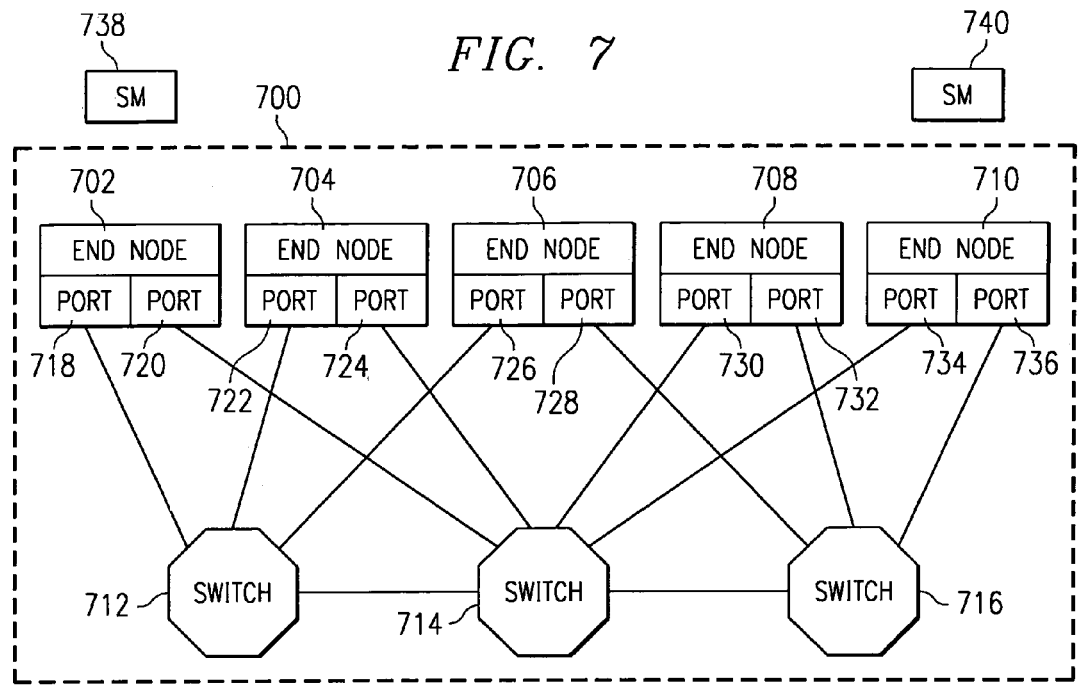
FIG. 7 is a diagram illustrating relations between subnet managers and subnet manager agents in accordance with a preferred embodiment of the present invention.

Turning next to FIG. 7, a diagram illustrating relations between subnet managers and subnet manager agents is depicted in accordance with a preferred embodiment of the present invention. In this example, subnet manager agents include end nodes 702–710 and switches 712–716. End nodes 702–710 include ports 718–736. Subnet 700 can have multiple subnet managers. In this example, subnet manager 738 and subnet manager 740 are used to configure and control subnet 700.

Subnet managers, such as subnet manager 738 and subnet manager 740, send SAN subnet management packets containing a management key (M_Key) as an access control mechanism. When a subnet manager takes management control of a component, such as end node 702 or switch 712, the subnet manager pushes its M_Key, along with a M_Key lease period, into the component. When the M_Key protection bits are appropriately set in the component, the component uses this M_Key to validate all future subnet management packets it receives within the M_Key lease period. Subsequent subnet management packets (SMPs) have their M_Key field compared with the value previously stored by the subnet manager on the component. If a subnet management packet has a M_Key field that matches the M_Key value stored in the SAN component, the packet is accepted. Otherwise, the packet is discarded.

Figure 8:
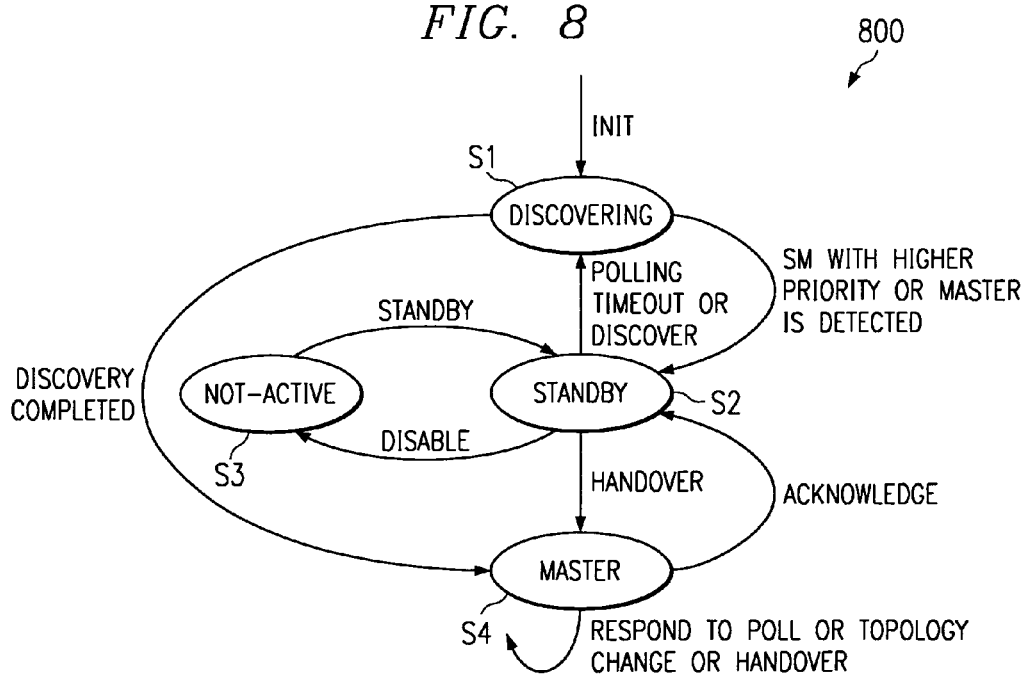
FIG. 8 is a state machine diagram for initializing a subnet manager in accordance with a preferred embodiment of the present invention.

Turning next to FIG. 8, a state machine diagram for initializing a subnet manager is depicted in accordance with a preferred embodiment of the present invention.

When state machine 800 for the subnet manager starts, state machine 800 enters the discovering state S1. Discovering state S1 is used during initialization of the subnet manager to discover devices on the subnet. In this state, the subnet manager uses subnet management packets to query ports that the subnet manager has access to. These packets are sent to all other nodes to gather information, including path delays of the subnet, concerning switches and end ports. In addition, this state also is used to discover whether there is already a master subnet manager on the network and to discover other subnet managers on the subnet, determine which potential subnet manager is to become the master subnet manager. The subnet manager sends messages, such as SubnGet(NodeInfo), SubnGet(PortInfo), and SubnGet (SMInfo) to obtain information about nodes, ports, and subnet managers.

In discovering state S1, a minimum amount of information is retrieved for use in determining whether another node has a higher priority. In the depicted examples, the information includes a physical address, GUID, in combination with a priority value used to determine priority for the master subnet manager. Further, a SM_Key also is obtained for authentication. A state parameter indicating the current state of the subnet master also is returned in response to a request to discover other nodes.

If a subnet manager having a higher priority is detected or a master subnet manager is detected, then state machine 800 shifts to a standby state S2. In standby state S2, the subnet manager may be placed into non-active state S3 by a master subnet manager. A subnet manager in standby state S2 periodically sends requests to the subnet manager in the master state and waits for a response to the request. This process is also referred to as polling. Calculation of the expected response time for the polling operation is beyond the scope of this invention. If the master subnet manager does not respond within the defined time out or after a predetermined number of retries, or if the current subnet master has not indicated its master SMLID, a state change occurs in which state machine 800 transitions from standby state S2 back to discovering state S1 to begin the discovery process again for selecting another master subnet manager.

If the master subnet manager responds to the poll, then state machine 800 remains in standby state S2. While in standby state S2, the subnet manager may receive a discover subnet manager packet from the master subnet manager requesting that it transition into discovering state S1. This is useful when a master subnet manager decides to relinquish its mastership and it wants a particular standby manager, for example the one with highest priority. This relinquishment will allow a head start in the discovery process, and thus, expedite the rediscovery process and minimize the potential disruption caused by changing the mastership.

In this example, a disable message from a master subnet manager causes the shift from standby state S2 to non-active state S3. Subnet managers in a non-active state do not participate in a polling scheme between the master subnet manager and other subnet managers in a standby state, such as standby state S2. State machine 800 may shift back into standby state S2 from non-active state S3 by receiving a standby message from a master subnet manager. A typical use of shifting a standby subnet manager into the not-active state S3 is when a master subnet manager determines that there are too many active standby managers.

In discovering state S1, state machine 800 shifts into master state S4 if the subnet manager discovers that it has the highest priority and its discovery process is complete. While in the master state S4, the master subnet manager configures the subnet unless the subnet is already configured. Further, in this state the subnet is periodically monitored for changes in configuration. If a change in configuration is detected, the master subnet manager sends request packets to the appropriate ports to determine the specifics of the reconfiguration. If in master state S4, one or more subnet managers are discovered having a higher priority, a handover subnet management packet may be sent to the master subnet manager having the highest priority. In response to receiving an acknowledge packet, state machine 800 shifts from master state S4 to standby state S2. In master state S4, if the subnet manager receives a handover subnet management packet from the lower priority subnet manager, this event does not cause a state transition out of master state S4.

State machine 800 also may shift into master state S4 from standby state S2 if a handover subnet management packet is received from a master subnet manager. This handover packet is received when the master subnet manager hands over mastership of the subnet to the standby subnet manager. This situation may occur due to a reconfiguration of the SAN which causes the current master subnet manager to discover that there exists a subnet manager in the standby state S2 which has a higher priority. State machine 800 will stay in master state S4 in response to events such as a poll message from another subnet manager or a topology change. Further, a handover message also will cause state machine 800 to remain in master state S4. The handover occurs as explained with respect to the shift of state machine 800 from state S4, to state S2. In this case, a handover would be an error. As a result, no state transition occurs.

Thus, the present invention provides a method, apparatus, and computer implemented instructions for negotiating mastership of a subnet for multiple subnet managers. Additionally, the mechanism provides a fail-over system to select a backup subnet manager in the event that the master subnet manager fails.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a node within network computing system for selecting a master subnet manager, the method comprising:
    sending requests from a first node to the network computing system to discover other nodes within the network computing system, wherein the first node contains a first subnet manager having a first priority;
    receiving a response to one of the requests from a second node within the network computing system, wherein the second node within the network computing system contains a second subnet manager having a second priority;
    comparing the second priority to the first priority;
    shifting the first subnet manager to a standby mode if the second priority is higher than the first priority; and
    shifting the first subnet manager to a master mode if no response is received from any node containing a subnet manager having a priority higher than the first priority and if in the discovery of the other nodes within the network computing system is complete.

2. The method of claim 1, wherein the node is associated with a first unique value and wherein the second node is associated with a second unique value, the method further comprising:
    comparing the first unique value to the second unique value if the first priority is equal to the second priority; and
    shifting the first subnet manager to a standby mode if the first unique value identify is less than the second unique value.

3. The method of claim 2, wherein the first unique value and the second unique value are globally unique identifiers.

4. The method of claim 1, wherein the network computing system is a system area network.

5. The method of claim 1, wherein the requests are system management packets.

6. The method of claim 1 further comprising:
    polling a master subnet manager in the network computing system in response to the first subnet manager shifting to a standby mode.

7. The method of claim 6, wherein the polling occurs periodically.

8. The method of claim 6 further comprising:
    reinitiating the steps of sending, receiving, comparing, shifting to a standby mode, and shifting to a master mode if a response to polling of the master subnet manager is absent.

9. The method of claim 8, wherein the response to polling of the master subnet manager is considered absent if a response is not received from the master subnet manager within a selected period of time and commensurate to the poll operation not completing after the poll operation has been retried a predetermined number of times.

10. The method of claim 1, wherein the steps of sending receiving, comparing, shifting to a standby mode, and shifting to a master mode are initiated prior to initialization of an operating system for the first node.

11. The method of claim 1, further comprising:
    shifting the first subnet manager from master code mode into standby mode in response to receiving a message to handover mastership of the network computing system.

12. The method of claim 1, further comprising:
    shifting the first subnet manager to a non-active mode from the standby mode in response to receiving a message to shift to non-active mode from a master subnet manager.

13. A data processing system in a first node comprising:
    a bus system;
    a host channel adapter connected to the bus system, wherein the host channel adapter provides a communications link to a network computing system;
    a memory including a set of instructions connected to the bus system; and
    a processing unit connected to the bus system, wherein the processing unit executes the set of instructions to send requests from a first node to the network computing system to discover other nodes within the network computing system, wherein the first node contains a first subnet manager having a first priority; receive a response to one of the requests from a second node within the network computing system, wherein the second node within the network computing system contains a second subnet manager having a second priority; compare the second priority to the first priority; shift the first subnet manager to a standby mode if the second priority is higher than the first priority; and shift the first subnet manager to a master mode if no response is received from any node containing a subnet manager having a priority higher than the first priority and if discovery of the other nodes within the network computing system is complete.

14. The data processing system of claim 13, wherein the first node is associated with a first globally unique identification and wherein the second node is associated with a second globally unique identification and wherein if the data system first node has an equal priority as compared to a highest priority received from any other node in the network computing system, the processing unit compares the first globally unique identification to the second globally unique identification to determine whether to shift into a master mode.

15. A network computing system comprising:
    fabric, wherein the fabric facilitates transfer of date; and
    a plurality of nodes connected to the fabric, wherein a first node within the plurality of nodes contains a first subnet manager that has a first priority and sends requests to discover other nodes within the network computing system, receives a response to one of the requests from a second node containing a second subnet manager that has a second priority, comparing the second priority to the first priority, shifts the first subnet manager to a standby mode if the second priority is higher than the first priority node, and shifts the first subnet manager to a master mode if discovery of the other nodes within the network computing system is complete and a response containing a subnet manager having a priority higher than the first priority the node is absent in responses received by the node.

16. An apparatus for selecting a master subnet manager, the apparatus comprising:
sending means for sending requests from a first node to a network computing system to discover other nodes within the network computing system, wherein the first node contains a first subnet manager having a first priority;
receipt means for receiving a response to one of the requests from a second node within the network computing system, wherein the second node within the network computing system contains a second subnet manager having a second priority;
comparison means for comparing the second priority to the first priority;
first shifting means for shifting the first subnet manager to a standby mode if the second priority is higher than the first priority; and
second shifting means for shifting the first subnet manager to a master mode if no response is received from any node containing a subnet manager having a priority higher than the first priority is and if discovery of the other nodes within the network computing system is complete.

17. The apparatus of claim 16, wherein the first node is associated with a first unique value and wherein the second node is associated with a second unique value, the method further comprising:
comparing means for comparing the first unique value to the second unique value if the first priority is equal to the second priority; and
third shifting means for shifting the first subnet manager to a standby mode if the first unique value identify is less than the second unique value.

18. The apparatus of claim 17, wherein the first unique value and the second unique value are globally unique identifiers.

19. The apparatus of claim 16, wherein the network computing system is a system area network.

20. The apparatus of claim 16, wherein the requests are system management packets.

21. The apparatus of claim 16 further comprising:
polling means for polling a master subnet manager in the network computing system in response to the first node shifting to a standby mode.

22. The apparatus of claim 21, wherein the polling occurs periodically.

23. The apparatus of claim 21 further comprising:
reinitiating means for reinitiating the sending means, receipt means, comparison means, first shifting means, and second shifting means if a response to polling of the master is absent.

24. The apparatus of claim 23, wherein the response to polling of the master subnet manager is considered absent if a response is not received from the master subnet manager within a selected period of time and commensurate to the poll operation not completing after the poll operation has been retried a predetermined number of times.

25. The apparatus of claim 16, wherein the sending means, receipt means, comparison means, first shifting means, and second shifting means are initiated prior to initialization of an operating system for the first node.

26. The apparatus of claim 16, further comprising:
third shifting means for shifting the first subnet manager from master mode into standby mode in response to receiving a message to handover mastership of the network computing system.

27. The apparatus of claim 16, further comprising:
third shifting means for shifting the first subnet manager to non-active mode from standby mode in response to receiving a message to shift to non-active mode from a master subnet manager.

28. A computer program product in a tangible computer readable medium for use in a first node within network computing system for selecting a master subnet manager, the computer program product comprising:
first instructions for sending requests from the first node to the network computing system to discover other nodes within the network computing system, wherein the first node contains a first subnet manager having a first priority;
second instructions for receiving a response to one of the requests from a second node within the network computing system, wherein the second node contains a second subnet manager having a second priority;
third instructions for comparing the second priority to the first priority;
fourth instructions for shifting the first subnet manager to a standby mode if the second priority is higher than the first priority; and
fifth instructions for shifting the first subnet manager to a master mode if no response is received from any node containing a subnet manager having a priority higher than the first priority and if discovery of the other nodes within the network computing system is complete.

* * * * *

UNITED STATES PATENT AND TRADEMARK OFFICE
CERTIFICATE OF CORRECTION

PATENT NO. : 6,941,350 B1  Page 1 of 1
APPLICATION NO. : 09/692346
DATED : September 6, 2005
INVENTOR(S) : Frazier et al.

It is certified that error appears in the above-identified patent and that said Letters Patent is hereby corrected as shown below:

Col. 13, line 42: after "if" delete "in the".

Col. 13, line 44: after "the" insert --first--.

Col. 14, line 17: after "master" delete "code".

Col. 14, lines 54-55: after "if the" delete "data system".

Signed and Sealed this

Tenth Day of April, 2007

JON W. DUDAS
*Director of the United States Patent and Trademark Office*